Patented Jan. 3, 1939

2,142,199

UNITED STATES PATENT OFFICE 2,142,199

HYDRAULIC POWER TRANSMISSION

Alf Lysholm and Fred Horney, Stockholm, Sweden, assignors to Aktiebolaget Ljungstroms Angturbin, Stockholm, Sweden, a corporation of Sweden Application June 15, 1935, Serial No. 26,804
In Germany June 30, 1934

16 Claims. (Cl. 60—54)

The present invention relates to hydraulic power transmissions and has particular reference to apparatus of this character for propulsion of rail cars and other like vehicles.

In transmission apparatus for rail cars it is desirable in order to prevent transmission to the prime mover of the shocks due to the rail joints that the transmission be as elastic as possible under all conditions of drive. It is also highly desirable in transmission apparatus of this kind to provide for a substantially direct drive as well as for a drive which will give the necessary torque multiplication required for acceleration purposes and for negotiating grades. Heretofore, hydraulic power transmissions have been proposed in which the various kinds of drive have been provided for by the utilization of a hydraulic coupling and a hydraulic torque converter so arranged that one or the other may be used to transmit power. In such apparatus the shift from one driving unit to the other has been effected by transferring working fluid from the working chamber of one unit to the other. Such transfer of the working fluid requires a considerable amount of time and this time lag is of substantial disadvantage since it results in a considerable deceleration, particularly when the shift is made while negotiating a grade. Further, the transfer of the working fluid makes it almost impossible to prevent the entry of air or other gases into one or both of the working chambers of the hydraulic apparatus. This in turn results in cavitation in the chambers and such action in turn results in both poor performance and premature wear on the parts.

It is a primary object of the present invention to improve upon prior forms of transmission apparatus of this character through the provision of apparatus whereby both the hydraulic coupling and the torque converter may be maintained constantly filled with working fluid and in which the shift in the character of the drive may be effected substantially instantaneously. Further and more detailed objects of the invention and the advantages to be derived from its use will appear more fully in conjunction with the ensuing description of several practical embodiments of apparatus for carrying the invention in effect, illustrated in the accompanying drawings in which:

Figure 1:
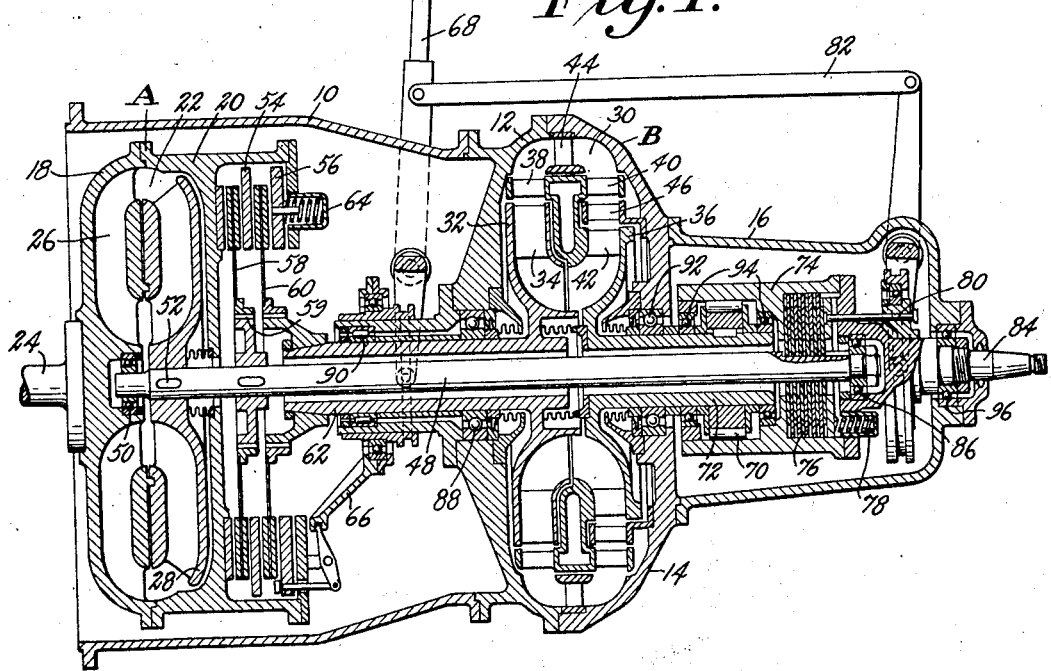
Fig. 1 is a more or less diagrammatic central longitudinal section of transmission apparatus embodying the invention.

Referring now more particularly to Fig. 1, the apparatus comprises a main stationary casing 5 formed of the casing parts 10, 12, 14 and 16. The hydraulic coupling is indicated generally at A, and consists of a housing comprising parts 18 and 20 and providing a working chamber 22 for power transmitting fluid. The housing part 18 is directly connected to the driving shaft 24 which may be the main shaft of a prime mover. A series of pump blades 26 connected to the housing part 18 is located in the working chamber 22, these blades constituting part of what may be called a pump rotor. A turbine rotor 28 carries a series of blades located in the working chamber of the coupling.

The torque converter, indicated generally at B, has a working chamber 30 in which is located the pump rotor 32 carrying a ring of pump blades 34 and a turbine rotor 36 carrying rings of turbine blades 38, 40 and 42. Rings of stationary guide blades 44 and 46 are fixed to the casing part 14.

The pump and rotor parts of the converter each have hollow shafts and an intermediate power shaft 48 passes through these hollow shafts.

At its forward end shaft 48 is mounted in a pilot bearing 50 and is rigidly connected to the turbine rotor of the coupling as by means of a key 52.

The housing part 20 of the coupling carries friction clutch discs 54 and 56 between which and the housing part the two driven clutch discs 58 and 60 are located. The driven disc 58 is keyed to the intermediate power shaft 48 and the outer part of the disc is advantageously splined to the hub part as at 59 to permit relatively axial movement of the disc parts upon engagement or disengagement of the clutch. The driven disc 60, of similar construction, has its hub rigidly secured to the shaft 62 of the pump rotor of the converter.

The driven discs are engaged simultaneously by a number of clutch springs one of which is shown at 64 and are simultaneously released by means of suitable release mechanism indicated generally at 66 and adapted to be operated through the medium of a clutch control element 68.

An over-running roller clutch comprising a series of rollers 70 is interposed between the shaft 72 of the turbine rotor of the converter and a clutch casing part 74 of a multiple disc clutch 76. One set of discs of the clutch 76 is rotationally fixed in the part 74 and the other set of discs is rotationally fixed to the intermediate power shaft 48. This clutch is adapted to be engaged by means of clutch springs 78 and to be released through the clutch release mechanism indicated generally at 80 and connected by link 82 to the clutch operating element 68. The clutch part 74 is rigidly connected to the driven shaft 84, the rear end of the intermediate power shaft 48 being carried within this part by means of the bearing 86.

The pump shaft of the converter is rotatably mounted in the casing by means of ball bearing 88 and roller bearing 90 and the turbine rotor of this unit is carried in the ball bearing 92 fixed in the casing part 14. Ball bearings 94 between the turbine shaft and the clutch part 74 serve to keep these parts in proper alignment. The driven shaft 84 is carried in the housing part 16 by means of ball bearing 96.

In the normal operation of the apparatus both the working chamber 22 of the coupling and the working chamber 30 of the converter are kept constantly filled with power transmitting fluid. The general construction of the converter is similar to that disclosed in U. S. Patent No. 1,900,119 granted March 7, 1933, on the application of Alf Lysholm and reference may be had to this patent for details of construction. One form of apparatus suitable for keeping the converter constantly filled with working fluid is disclosed in U. S. Patent No. 1,934,936 granted November 14, 1933, on the application of Alf Lysholm. From the drawings it will be evident that the clutch comprising the driven discs 58 and 60 and the multiple disc clutch 76 are arranged so as to be alternatively engageable, one clutch being released when the other is engaged. In the position of the apparatus shown in Fig. 1, the clutch 76 is engaged while the clutch associated with the coupling housing is disengaged. Under this condition substantially direct drive between the driving shaft 24 and the driven shaft 84 is effected, the line of power transmission being through the working fluid in the coupling from the pump rotor 26 to the turbine rotor 28, the intermediate shaft 48 and the clutch 76. When drive is being effected through the coupling the pump rotor of the converter is idle due to the disengagement of the clutch disc 60 and the turbine rotor of the converter is also idle because of the over-running action of the rollers 70 of the over-running clutch disposed between the turbine rotor shaft and the clutch housing 74.

If drive through the converter is desired, the clutch operating element 68 is moved to the left as seen in Fig. 1 to effect release of the clutch 76 and the engagement of the clutch discs 58 and 60. Drive is then transmitted mechanically from the driving shaft through the housing of the coupling to the pump shaft of the converter, and from the turbine shaft of the converter drive is then transmitted mechanically through the over-running clutch to the clutch part 74 which is directly connected to the driven shaft 84. At the same time, engagement of the clutch disc 58, which is engaged at the same time disc 60 is engaged, causes the intermediate shaft 48 and with it the turbine rotor 28 of the coupling to be rotated at the same speed as that of the driving shaft. This is possible because of the disengagement of the clutch 76. Under this condition of drive the entire hydraulic coupling rotates as a unit at driving shaft speed, without relative rotation between the several parts, and consequently there is no power loss due to drag of one part of the coupling with respect to another.

With an arrangement as above described it will be evident that substantially instantaneous shift of one type of drive to the other can be effected and that difficulties encountered in the operation of the hydraulic units due to cavitation is avoided because of the fact that they may be maintained constantly filled with working fluid.

In this connection it is further to be noted that the arrangement is such that mechanical clutch means may be practically employed even in units of relatively large power transmitting capacity. Ordinarily, practical operating difficulties are encountered with friction and other like mechanical clutches when the power transmitting requirements are relatively large. In the present instance however it is to be noted that engagement of either one of the mechanical clutches does not provide positive connection between the driving and driven shafts, which shafts are always connected together by the elastic connection provided by the hydraulic units. Thus the mechanical clutches may be engaged without shock or without the necessity for slipping of the clutches to avoid too sudden engagement. Any slip required to take up the shock of engagement between the driving and driven shafts is provided for by the hydraulic units.

Figure 2:
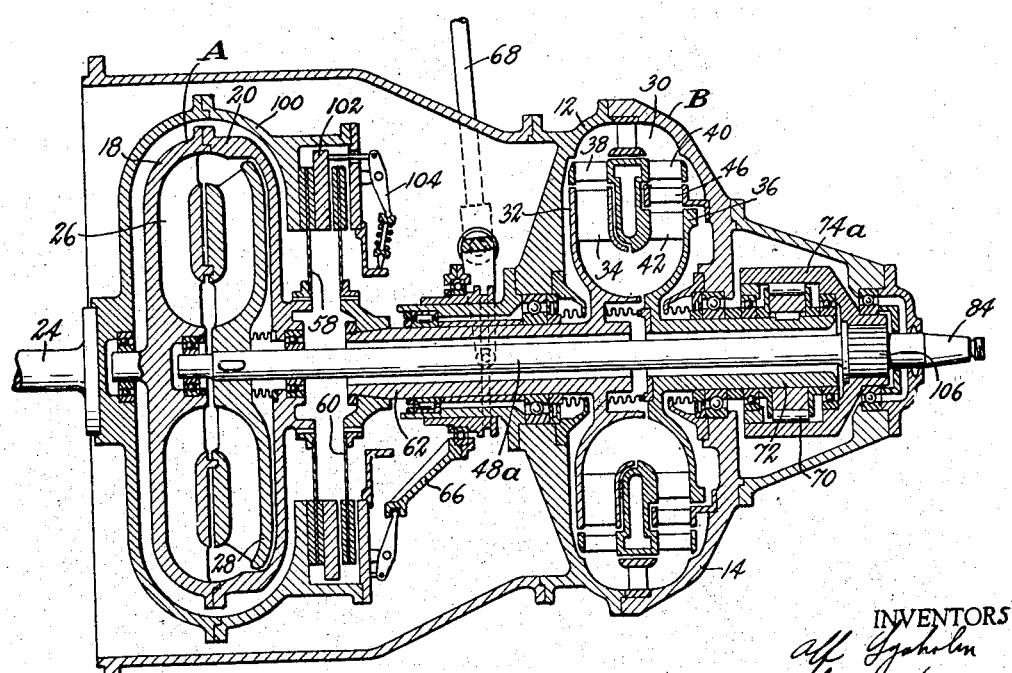
Fig. 2 is a similar section showing another form.

Turning now to the arrangement shown in Fig. 2, driving shaft 24 is connected by a rotatably mounted clutch housing part 100 carrying an axially shiftable clutch disc 102 arranged to cause alternative engagement of either the clutch disc 60 connected to the pump shaft 62 of the converter B or the clutch disc 58 which in this instance is connected to the pump rotor 26 of the coupling A through the medium of the housing parts 18 and 20.

Alternative engagement of the clutch disc 58 or the clutch disc 60 is effected by means of a toggle mechanism indicated generally at 104 and connected by means of shift mechanism indicated generally at 66 to the clutch shifting element 68.

The construction of the converter B is generally the same as that previously described and need not be described again in detail. In this instance the over-running clutch rollers 70 transmit power from the turbine shaft 72 to the part 74a which is directly connected to the driven shaft 84, and the clutch 76 is omitted.

In the present construction the intermediate power shaft 48a is rigidly connected to the driven shaft 84 as by means of the spline connection 106 and in effect forms an integral part of the driven shaft.

In the figure, the parts are shown with the clutch 58 engaged and with the parts in this position drive is effected through the coupling, the line of drive being from the driving shaft 24 through the clutch housing 100, clutch disc 58 and parts 20 and 18 to the pump rotor 26, and from the turbine rotor 28 through the shaft part 48a to the driven shaft 84. Under this condition of drive the converter B is idle since the clutch disc 60 is disengaged and the over-running clutch rollers 70 release to permit the turbine rotor 36 of the converter to remain idle.

If the clutch disc 102 is shifted to the right to release the disc 58 and engage the disc 60, drive is then transmitted from the clutch casing 100 to the pump shaft 62 of the converter and from the turbine shaft 72 of the converter through the over-running clutch to the part 74a and the driven shaft.

The principal difference between the arrangement shown in this figure and the Figure 1 is that in the present instance when drive is through the converter the rigid connection between the driven shaft and the turbine rotor of the coupling causes the latter to be rotated. This however entails very little loss since the pump rotor of the coupling is free to rotate because of the disengagement of the clutch disc 58 and the entire coupling will rotate substantially as an entire unit under the influence of the drive transmitted to the turbine rotor of this part of the apparatus.

Figure 3:
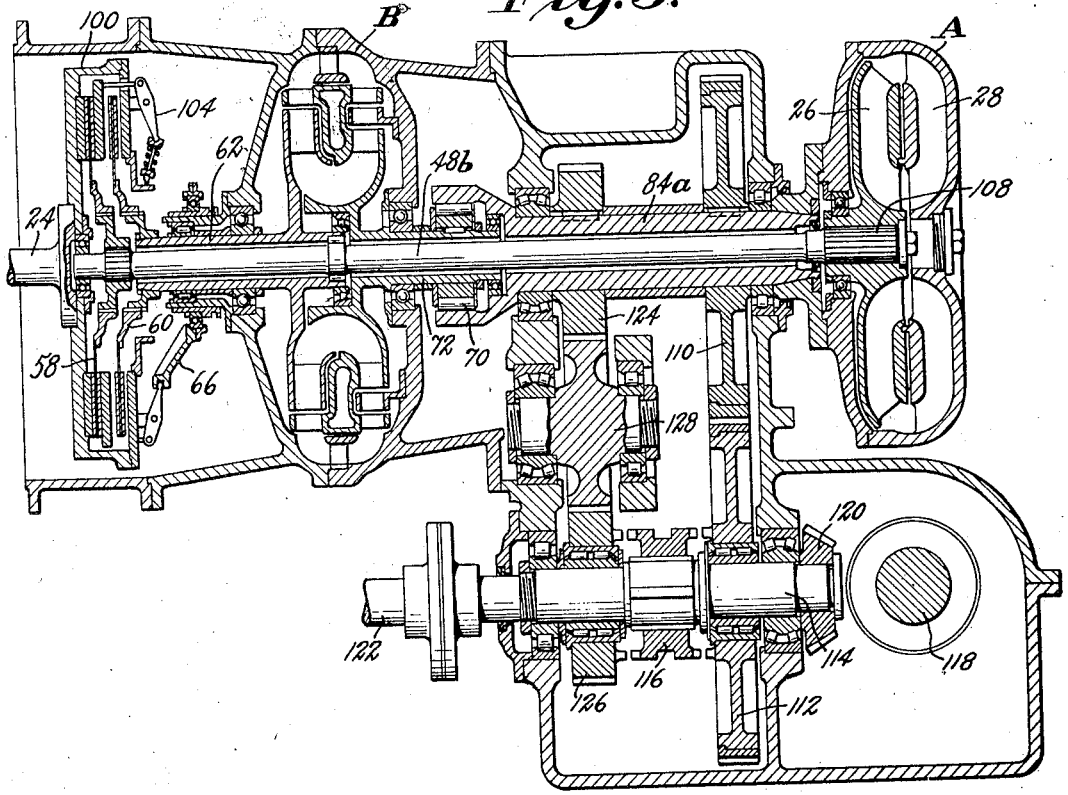
Fig. 3 is a similar section showing a third form.

In Figure 3 an arrangement is illustrated which is functionally substantially the same as the arrangement shown in Figure 2. In this instance the converter B is arranged between coupling A and the clutch housing 100 which is connected to the driving shaft 24. The clutch discs 58 and 60 are arranged to be alternatively engaged through the toggle mechanism 104 and the shift apparatus 66. The intermediate shaft part 48b is connected at one end to the clutch disc 58 and extends through a hollow driven shaft 84a. At its opposite end the shaft part 48b is rigidly connected as by means of splines 108 to the pump rotor 26 of the coupling. The turbine rotor 28 of the coupling is carried by and is keyed or otherwise rigidly connected to the driven shaft part 84a.

The end of this shaft part opposite that which carries the turbine part of the coupling is connected to the converter turbine shaft 72 through the over-running clutch rollers 70.

The apparatus illustrated is designed for the transmission of power from a single prime mover to a plurality of driving axles and to this end the driven shaft part 84a carries a gear 110 meshing with a gear 112 which is adapted to be connected to a countershaft 114 by means of a dog clutch 116. The countershaft 114 is adapted to drive an axle shaft 118 by means of a bevel pinion 120 and ring gear (not shown) and an extension 122 of the countershaft is adapted to drive a second axle shaft in similar manner.

In order to effect reversal of the direction of drive to the axle shafts a second gear train comprising gears 124 and 126 and an idler gear 128 is provided between the shaft part 84a and the countershaft, gear 126 being rotatably mounted on the countershaft and adapted to be secured to the countershaft in alternation with the gear 112 by means of the dog clutch 116.

The operation of this form of the apparatus will be largely evident from the drawing and from the description of the form of apparatus shown in Fig. 2. In the position of the parts shown, drive is transmitted through the clutch disc 58 and the shaft part 48b to the pump rotor of the coupling and from the turbine rotor of the coupling directly to the driven shaft part 84a. Shifting of the clutch mechanism so as to release the disc 58 and engage the disc 60 causes drive to be transmitted to the pump shaft 62 of the converter and from the turbine shaft 72 of the converter through the over-running clutch rollers to the driven shaft part 84a.

As in the form shown in Fig. 2, the converter parts are disconnected and remain idle while drive is being transmitted through the coupling and when drive is being transmitted through the converter the direct connection between the driven shaft part 84a and the turbine rotor of the coupling causes this part to rotate at the speed of the driven shaft, carrying with it the pump rotor 26, which is free to rotate because of the disengagement of the clutch disc 58.

Figure 4:
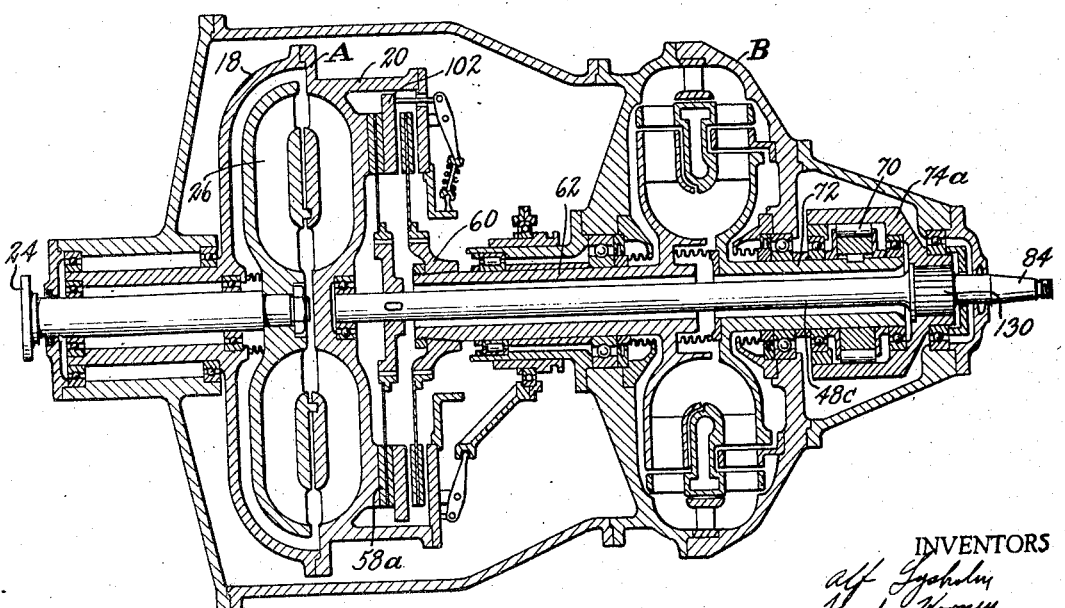
Fig. 4 is a similar section showing still another.

In the arrangement shown in Fig. 4 the hydraulic coupling is interposed in the line of drive between the driving shaft and the clutch mechanism which controls the transmission of power to the driven shaft. In this instance the driving shaft 24 is rigidly connected to the pump rotor 26 of the coupling A, the housing part 18 of which is rotatably mounted on suitable bearings in the casing of the transmission. The housing part 20 carries the driving clutch disc 102 which is adapted to engage either the driven disc 60 connected to the converter pump shaft 62 or a clutch disc 58a which is rigidly connected to an intermediate shaft part 48c which is in turn rigidly connected by means of a spline connection 130 to the driven shaft 84. The turbine shaft 72 of the converter is connected by means of the over-running clutch rollers 70 to the clutch part 74a which is in turn rigidly connected to the driven shaft 84.

In this form of the apparatus the hydraulic coupling A is always employed as a power transmitting device and drive is effected alternatively either from the turbine rotor part of the coupling directly to the driven shaft 84 by means of the clutch disc 58a or to the pump shaft of the converter through the clutch disc 60. When the latter connection is employed the coupling and the converter are connected in series with respect to the line of drive. When the coupling alone is used the entire converter is idle because of the disengagement of the clutch 60 and the over-running action of the rollers 70 of the over-running clutch.

From the preceding description it will be evident that the invention may be incorporated in many different specific forms of apparaus and it is accordingly to be understood as including all forms and arrangements of apparatus falling within the scope of the appended claims.

We claim:

1. In hydraulic power transmitting apparatus for the transmission of power from a driving shaft to a driven shaft, a hydraulic coupling unit having a working chamber constantly filled with power transmitting fluid and operating solely as a power transmitting coupling, a separate multiple stage hydraulic torque converter unit having a working chamber constantly filled with power transmitting fluid and operating solely as a torque multiplying power transmitter, and mechanical means for connecting said units in selected power transmitting relation between the driving shaft and the driven shaft, said mechanical means including parts capable of release to render the torque converter inoperative to transmit power while power is being transmitted through said coupling.

2. In hydraulic power transmitting apparatus for the transmission of power from a driving shaft to a driven shaft, a hydraulic coupling unit having a working chamber constantly filled with power transmitting fluid and operating solely as a power transmitting coupling, a separate multiple stage hydraulic torque converter unit having a working chamber constantly filled with power transmitting fluid and operating solely as a torque multiplying power transmitter, and mechanical means arranged to permit selective transmission of all of the power delivered by the driving shaft through either the coupling or alternatively through the converter to the driven shaft.

3. In hydraulic power transmitting apparatus for the transmission of power from a driving shaft to a driven shaft, a hydraulic coupling unit having a working chamber constantly filled with power transmitting fluid and operating solely as a power transmitting coupling, a separate multiple stage hydraulic torque converter unit having a working chamber constantly filled with power transmitting fluid and operating solely as a torque multiplying power transmitter, and mechanical means comprising two mechanical clutch elements alternatively engageable to selectively connect one or the other of said units in direct power transmitting relation with the driven shaft.

4. In hydraulic power transmitting apparatus for the transmission of power from a driving shaft to a driven shaft, a hydraulic coupling unit having a working chamber constantly filled with power transmitting fluid and operating solely as a power transmitting coupling, a separate multiple stage hydraulic torque converter unit having a working chamber constantly filled with power transmitting fluid and operating solely as a torque multiplying power transmitter, and mechanical clutch means for selectively causing transmission of power through one or the other of said units from the driving shaft to the driven shaft.

5. In hydraulic power transmitting apparatus for the transmission of power from a driving shaft to a driven shaft, a hydraulic coupling and a hydraulic torque converter each having a working chamber constantly filled with power transmitting fluid and each having a pump rotor and a turbine rotor in its working chamber, means providing a rigid connection between the driven shaft and the turbine rotor of the coupling and an over-running clutch between the driven shaft and the turbine rotor of the converter.

6. In hydraulic power transmitting apparatus for the transmission of power from a driving shaft to a driven shaft, a hydraulic coupling and a hydraulic torque converter each having a working chamber constantly filled with power transmitting fluid and each having a pump rotor and a turbine rotor in its working chamber, an over-running clutch between the driven shaft and the turbine rotor of the converter and a releasable mechanical clutch between the driven shaft and the turbine rotor of the coupling.

7. In hydraulic power transmitting apparatus for the transmission of power from a driving shaft to a driven shaft, a hydraulic coupling and a hydraulic torque converter each having a working chamber constantly filled with power transmitting fluid and each having a pump rotor and a turbine rotor in its working chamber, an intermediate shaft, a rigid connection between the driving shaft and the pump rotor of the coupling, clutch means for connecting the pump rotor of the coupling to the intermediate shaft and to the pump rotor of the converter at the same time, a rigid connection between the turbine rotor of the coupling and the intermediate shaft, an over-running clutch in the line of power transmission from the turbine rotor of the converter to the driven shaft, and releasable clutch means between the intermediate shaft and the driven shaft.

8. In hydraulic power transmitting apparatus for the transmission of power from a driving shaft to a driven shaft, a hydraulic coupling and a hydraulic torque converter each having a working chamber constantly filled with power transmitting fluid and each having a pump rotor and a turbine rotor in its working chamber, an intermediate shaft, a rigid connection between the driving shaft and the pump rotor of the coupling, clutch means for connecting the pump rotor of the coupling to the intermediate shaft and to the pump rotor of the converter at the same time, a rigid connection between the turbine rotor of the coupling and the intermediate shaft, an over-running clutch in the line of power transmission from the turbine rotor of the converter to the driven shaft, clutch means between the intermediate shaft and the driven shaft, and means for engaging said clutch means in alternation.

9. In hydraulic power transmitting apparatus for the transmission of power from a driving shaft to a driven shaft, a hydraulic coupling and a hydraulic torque converter each having a stationary casing providing a working chamber constantly filled with power transmitting fluid and each having a pump rotor and a turbine rotor in its working chamber, clutch means for alternatively connecting the pump rotor of the coupling or the pump rotor of the converter to the driving shaft, and means for connecting the turbine rotors of both the coupling and the converter to the driven shaft, the last mentioned means including means for releasing the turbine rotor of the converter from its connection to the driven shaft to permit the rotor of the converter to remain stationary when power is transmitted from the turbine rotor of the coupling directly to the driven shaft.

10. In hydraulic power transmitting apparatus for the transmission of power from a driving shaft to a driven shaft, a hydraulic coupling unit having a rotatably mounted casing providing a working chamber constantly filled with power transmitting fluid, a hydraulic torque converter unit separate from said hydraulic coupling unit and having a stationary casing providing a working chamber constantly filled with power transmitting fluid, said coupling unit operating solely as a power transmitting coupling and said converter unit operating solely as a torque multiplying power transmitter, and mechanical means for connecting said units in selected power transmitting relation between the driving shaft and the driven shaft, said mechanical means including parts capable of release to render said converter unit stationary and inoperative to transmit power while power is transmitted through said coupling unit from the driving shaft to the driven shaft.

11. In hydraulic power transmitting apparatus for the transmission of power from a driving shaft to a driven shaft, a hydraulic coupling unit having means providing a working chamber constantly filled with power transmitting fluid and a pump and a turbine in said chamber, said coupling operating solely as a power transmitting coupling, a hydraulic torque converter unit having means providing a stationary working chamber constantly filled with power transmitting fluid and having a pump and a turbine rotor and fixed guide blades in said chamber, said torque converter unit operating solely as a torque multiplying power transmitter, and mechanical means arranged to permit selective transmission of all of the power delivered by the driving shaft alternatively through the torque converter unit or through the coupling, said means including parts capable of releasing the torque converter unit to permit it to remain stationary when power is transmitted from the driving shaft to the driven shaft through the hydraulic coupling.

12. In hydraulic power transmitting apparatus for transmitting power from a driving shaft to a driven shaft, a stationary casing providing a working chamber constantly filled with power transmitting fluid, a pump rotor mounted in said casing and having pump blades located in said chamber, a turbine rotor mounted in said casing and having a plurality of turbine stages located in said chamber, said rotors having hollow shaft parts mounted in alignment to provide a passage therethrough, a shaft part extending through said passage, a sleeve member rotatably mounted in said casing, said shaft part extending through said sleeve member, a hydraulic coupling connecting said shaft part and said sleeve member, an over-running clutch connecting said turbine rotor and said sleeve member, clutch means for selectively coupling said driving shaft to either said pump rotor or said shaft part, and gearing for connecting said sleeve member to the driven shaft.

13. In hydraulic power transmitting apparatus, a hydraulic torque converter comprising a stationary casing providing a chamber for working fluid, pump and turbine rotors mounted in said casing and having aligned hollow shaft parts, a hollow sleeve member rotatably mounted in alignment with the hollow shaft part of the turbine rotor, an over-running clutch for releasably connecting the turbine rotor to the adjacent end of said sleeve member, a power shaft extending through said hollow shaft parts and said sleeve member, means connecting said power shaft to the end of the sleeve member remote from said turbine rotor, means for selectively transmitting power to said sleeve member through said torque converter or through said power shaft, and gearing arranged to transmit from said sleeve member to a driven shaft power transmitted to the sleeve member either from said turbine rotor or from said power shaft.

14. In apparatus of the character described, a hydraulic torque converter having a driving member and a driven member, said members having hollow shaft parts mounted in axial alignment, a coupling having a driving part and a driven part, a hollow sleeve member mounted in axial alignment with the first mentioned members, gearing for transmitting power from said sleeve member to a driven shaft including a gear mounted externally of said sleeve member intermediate its ends, an over-running clutch for transmitting power from said driven member to one end of said sleeve member, a power shaft extending through the first mentioned members and said sleeve member and connected to the driving part of said coupling, the driven part of said coupling being connected to the end of said sleeve member opposite said over-running clutch, and clutch means for releasably connecting said driving member and said power shaft.

15. Power transmission apparatus including hydraulic power transmission mechanism comprising a pump member and a turbine member, said members having aligned hollow shaft parts providing a passage extending therethough, a hollow sleeve rotatably mounted in alignment with said members, gearing including a gear mounted on said sleeve, a free wheel clutch for transmitting power from said turbine member to a part of said sleeve between said gear and said hydraulic mechanism and means including a shaft extending through said passage and the aligned bore of said sleeve for transmitting power independently of said hydraulic mechanism to a part of the sleeve on the other side of said gear, said gearing being arranged to transmit to a driven shaft power transmitted to said sleeve from either the hydraulic mechanism or the shaft extending through the bore of said sleeve.

16. Power transmission apparatus including hydraulic power transmission mechanism comprising a pump member and a turbine member having parts working in a common chamber for working fluid and aligned shaft parts, the shaft part of said turbine member being hollow to provide a passage extending therethrough, a hollow sleeve rotatably mounted in alignment with said shaft parts, gearing including a gear mounted on said sleeve, means including a driving shaft extending through the hollow shaft part of the turbine member and the aligned bore of the sleeve for transmitting power independently of said hydraulic mechanism to a part of said sleeve on the side of the gear remote from said hydraulic mechanism, and means for transmitting power from said turbine member to a part of the sleeve between the hydraulic mechanism and said gear including a coupling releasable to permit said turbine member to come to rest when power is transmitted to said sleeve through said shaft, said gearing being arranged to transmit to a driven shaft power transmitted to said sleeve from either the hydraulic mechanism or said driving shaft.

ALF LYSHOLM.
FRED HORNEY.